(12) United States Patent
Shin et al.

(10) Patent No.: US 8,345,915 B2
(45) Date of Patent: Jan. 1, 2013

(54) MULTI-FUNCTION MICRO SPEAKER

(76) Inventors: Kwangshik Shin, Seoul (KR);
Sanghack Ko, Busan (KR)

( * ) Notice: Subject to any disclaimer, the term of this patent is extended or adjusted under 35 U.S.C. 154(b) by 444 days.

(21) Appl. No.: 12/307,352

(22) PCT Filed: Aug. 1, 2006

(86) PCT No.: PCT/KR2006/003019
§ 371 (c)(1),
(2), (4) Date: Jan. 2, 2009

(87) PCT Pub. No.: WO2008/004718
PCT Pub. Date: Jan. 10, 2008

(65) Prior Publication Data
US 2009/0285417 A1    Nov. 19, 2009

(30) Foreign Application Priority Data

Jul. 3, 2006 (KR) .................. 10-2006-0062088

(51) Int. Cl.
*H04R 25/00* (2006.01)
(52) U.S. Cl. ......... 381/396; 381/151; 381/162; 381/398
(58) Field of Classification Search .............. 381/151, 381/162–165, 396, 398, 410
See application file for complete search history.

(56) References Cited

U.S. PATENT DOCUMENTS 6,639,992 B2 * 10/2003 Kobayashi et al. ........... 381/396
6,834,114 B2 * 12/2004 Kobayashi et al. ........... 381/396
7,158,650 B2 * 1/2007 Furuya et al. .................. 381/396

FOREIGN PATENT DOCUMENTS

| JP | 2000-070856 A | 3/2000 |
| JP | 2002-263573 A | 9/2002 |
| JP | 2003-125474 A | 4/2003 |
| JP | 2005-269497 A | 9/2005 |
| JP | 2006-080869 A | 3/2006 |
| KR | 20-0349093 | 4/2004 |
| KR | 2005-0030183 | 3/2005 |
| KR | 20-0402566 | 12/2005 |
| KR | 20-0402566 Y1 | 12/2005 |

* cited by examiner

*Primary Examiner* — Ha Tran T Nguyen
*Assistant Examiner* — Raj R Gupta
(74) *Attorney, Agent, or Firm* — Park & Associates IP Law, P.C.

(57) ABSTRACT

A multi-functional subminiature speaker, namely a bone conduction speaker, which can generate vibration for a bone conduction function, bodily sensation of vibration, speaker attachment, and the vibration modes over the housing unit, without any projections, and which has an acoustic portion unit detachably mounted. The bone conduction is performed without the projections because the vibration can be generated over the whole surface of the multi-functional subminiature speaker, such that loss of the magnetic force transmitted to the vibration coil is minimized by disposing the magnets on both inner and outer sides with respect to the vibration coil.

8 Claims, 4 Drawing Sheets

MULTI-FUNCTION MICRO SPEAKER

TECHNICAL FIELD

The present invention relates to a multi-functional subminiature speaker, more particularly, to a bone conduction speaker, which can generate vibration for bone conduction, bodily sensation of vibration, speaker attachment, and vibration mode over the housing unit, that is, over a front protector of the speaker, a housing, and an outer side of a rear cover, without any projections, and which has an acoustic portion unit further detachably mounted.

A general speaker generates vibrating movement of an acoustic plate by means of magnetic force produced by the application of the electrical input signal to a voice coil of the acoustic plate, and the vibrating movement vibrates a tympanic membrane by the transmission of air molecules to thereby produce acoustic signal discernable to us.

Sound is inputted to an ear opening of the human being through an external auditory canal and is vibrated in the tympanic membrane, so that cells are stimulated in the internal ear at the inside of the tympanic membrane and the stimulation is transmitted to a brain, resulting in the transmission to the human being. The audible frequency range in which the human being can hear the sound is within the range of about 20 to 20,000 Hz, and the frequency range conforming to the human auditory sense is about 125 to 8,000 Hz. Also, while the frequency range in which the normal human being uses in conversing with each other, that is, communication voice range is mainly 500 to 2,000 Hz, however, sound of all wavelengths or any special wavelength cannot be heard to those who have impaired of hearing.

Accordingly, a bone conduction speaker has been diversely developed so that those who have impaired of hearing can hear music as can the normal human being, and can perform telephone conversations by using a mobile phone. The bone conduction speaker has a configuration in which those who have impaired of hearing in the external and mid ear can hear the sound by vibrating the bone around an auricle in contrast to the conventional speaker, which converts the general electrical signal into acoustic signal. As a result, it can be applied to diverse fields such as a speaker for those who have impaired of hearing, communications of the normal human beings at the seriously noise circumstances such as factory or construction field, and the like, and a speaker for a communication device ensuring the privacy and preventing the user's exposure to the adjoined surrounding human beings.

BACKGROUND ART

In Korean utility model registration No. 221534, there were disclosed a bone conduction telephone for those who have impaired of hearing and a hearing aid vibrator by using a piezoelectric device as described above.

Figure 1:
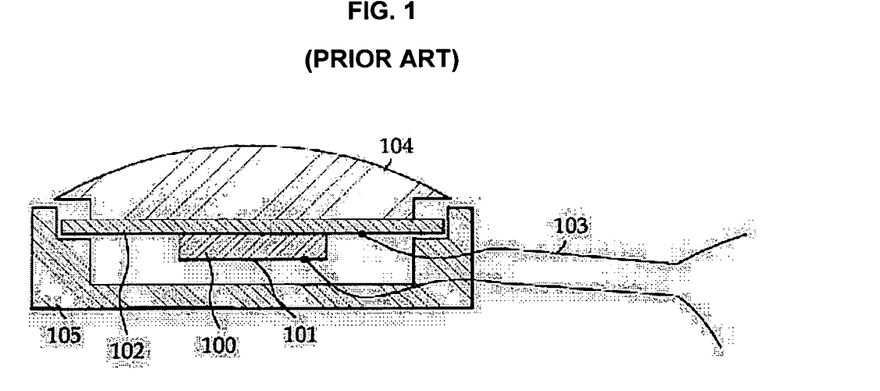
FIG. 1 is a cross-sectional view showing a conventional bone conduction telephone using a piezelectric device.

Referring now to FIG. 1, which shows the bone conduction telephone and the hearing aid vibrator using the conventional piezoelectric device, there were disclosed a bone conduction telephone and a hearing aid vibrator using the piezoelectric device, comprising a piezoelectric device 100 for generating physical vibration according to the application of electrical voice signal, vibrating plates 101 disposed at both end sides of the piezoelectric device 100, which apply the electrical signal to the piezoelectric device 100 through a conducting wire 103, a front contact portion 104 mounted closely and connected to an electrode plate 102 for transmitting the vibration to the outside, and a cover 105 for protecting and supporting the piezoelectric device, whereby the piezoelectric device 100 generates vibration conforming to the voice frequency by means of the piezoelectric effect, according to the voice signal applied through both the vibration plate 101 and the electrode plate 102 to thereby transmit the generated vibration signal to the outside.

However, since the bone conduction telephone and the hearing aid vibrator using the subminiature vibrator and the piezoelectric device should employ high impedance and high input voltage, the output acoustic pressure was low and it was difficult to make them compact, so a lot of problems were produced in implementing it actually.

Furthermore, a subminiature acoustic vibrator was disclosed in Korean Patent Laid-Open Publication No. 2001-0106898.

Figure 2:
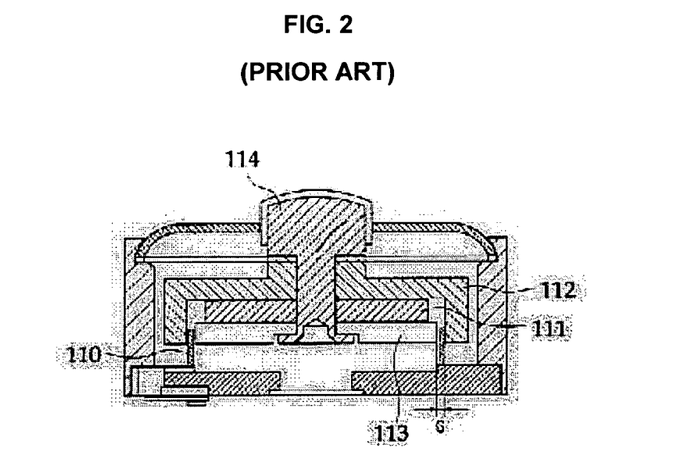
FIG. 2 is a cross-sectional view showing a conventional subminiature acoustic vibrator.

Reviewing the subminiature acoustic vibrator with regard to FIG. 2, when the electric current is applied to a terminal portion (not shown) from the outer electric power supply source to thereby supply it to a voice coil 110, the voice coil 110 induces the change of magnetic field from the electrical energy of voice signal. In other words, when the electric current is applied to the voice coil 110, magnetic field is produced between the voice coil 110 positioned in the clearance of the magnetic circuit comprising a yoke 112, a magnet 111, and an upper plate 113, the magnetic circuit comprising the yoke 112 is made to vibrate in the upward and downward directions by means of the Fleming's left hand law, through the interaction between the magnetic field in the magnetic circuit, the vibration contact portion 114 connected to the yoke 112 is made to vibrate concurrently, and the vibration of the vibration contact portion 114 is transmitted to a head portion of a human being, so that those who impaired of hearing can hear the bone conduction sound.

However, according to the bone conduction speaker, the yoke 112, the magnet 111, and the upper plate 113 are operated as parts for forming the magnetic field and vibrated in the upward and downward directions, so that high driving voltage is required to vibrate the yoke 112, the magnet 111, and the upper plate 113. Accordingly, there is caused a problem of requiring a large amount of electric power consumption.

In this regard, a subminiature bone conduction speaker using a vibrating plate, and a mobile phone with the same have been disclosed in Korean patent registration No. 0378156.

Figure 3:
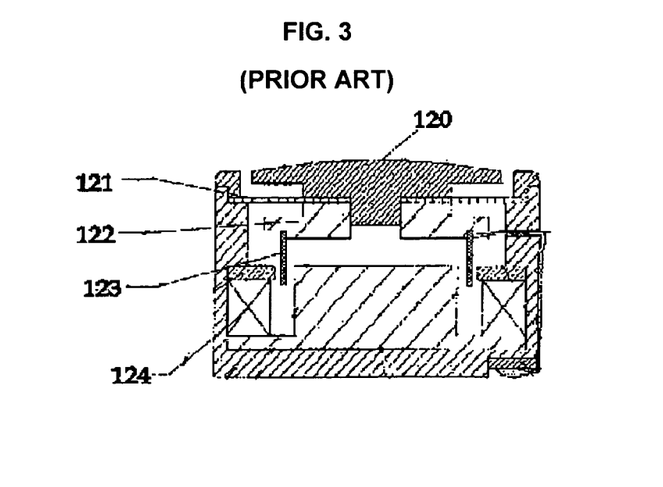
FIG. 3 is a cross-sectional view showing a subminiature bone conduction speaker using the vibrating plate and a mobile phone with the same.

Reviewing the subminiature bone conduction speaker using a vibrating plate, which is a conventional bone conduction speaker, and a mobile phone with the same with reference to FIG. 3, a projection 120, an auxiliary vibrating plate 122, and a voice coil 123 are mounted to a vibrating plate 121, so that the mastoid 120, an auxiliary vibrating plate 122, and the voice coil 123 are constructed to vibrate by using the elasticity of the vibrating plate 121 resulting in performing of the bone conduction, after the magnetic force applied to the voice coil 123 is affected by a ring type magnet 124.

DISCLOSURE OF INVENTION

Technical Problem

Such conventional bone conduction speakers as described above are of a configuration in which the projection or the mastoid projecting to the outside are contacted directly with a skull bone forming the head bone to vibrate it to thereby perform the bone conduction. However, since the projection or the mastoid, which is directly connected to a vibration spring, is subjected to the pressure from the external factor such as the skull bone of the human being, it is interferred at the time of generating the vibration for performing the bone conduction, so that it is impossible to perform the bone conduction accurately and with high reliability.

Furthermore, there occurs a problem that the vibration for the bone conduction is generated too weak, because the vibrating plate or the vibration spring used to the conventional bone conduction speaker is integrated with the yoke acting as a vibration weight, the magnet, and the top plate to perform the stronger bone conduction, and it cannot transmit the elasticity effectively when the weight is increased.

Also, with regard to the conventional bone conduction speaker, the application capacity is reduced depending on the requirements of the speaker capable of performing only the bone conduction, or requirements of the speaker capable of performing the bone conduction and the acoustic transmission concurrently, and it is not equipped with all of the functions of bodily sensation of vibration mode, the speaker attachment mode, and the vibration mode, and it becomes difficult to apply for a terminal for mobile communication, or small equipment, and the like, because the manufacturing cost is high or it gets larger in size.

Technical Solution

The primary object of the present invention is to provide a multi-functional subminiature speaker with a bone conduction function and without a projection or a mastoid, which is devised to settle a conventional problem that the reliability of the bone conduction is reduced, because the projection and the mastoid connected directly to the vibration weight and the vibration spring are affected by the pressure of the external factor such as the skull bone due to the transmission of the vibration of the bone conduction to the bone of the skull bone of the user through the contact of the projection and the mastoid connected to the vibration weight and the vibration spring with the bone of the skull bone, and generates vibration for the bone conduction of high reliability over the whole housing unit of the multi-functional subminiature speaker, that is, over the whole outer side of the front protector, the housing, and the rear cover.

Also, another object of the present invention is to provide a multi-functional subminiature speaker capable of performing the functions of security mode, bone conduction, bodily sensation of vibration, speaker attachment, and vibration mode in response to the input signals.

Still another object of the present invention is to provide a structure capable of adding an acoustic speaker to the bone conduction speaker, so that it is possible to use only the bone conduction speaker or to use the bone conduction speaker and the sound transmission speaker concurrently by improving the application capacity of the bone conduction speaker.

Yet another object of the present invention is to provide a multi-functional subminiature speaker comprising a corrugated cross-type vibration spring, which is capable of performing the functions of bone conduction, bodily sensation of vibration, speaker attachment, and the vibration mode without the projection.

Advantageous Effects

As described above, in case of the multi-functional subminiature bone conduction speaker according to an embodiment of the present invention, it is possible to perform the bone conduction without the projections because the vibration can be generated over the whole surface of the multi-functional subminiature speaker, that is, over the whole outer side of the housing unit, by being constructed such that loss of the magnetic force transmitted to the vibration coil is minimized by disposing the magnets on both inner and outer sides with respect to the vibration coil, the vibration force has been improved by making the vibration weight unit to be constructed of the yoke, the central and external magnets, and the inner and outer top plates integrally by means of the rivet shaft to thereby increase the weight of the vibration weight, and the corrugated cross-type vibration spring is provided that is adapted to generate the vibration over the whole housing unit in such a manner as to vibrate the vibration weight of the increased weight effectively and to generate vibration in the upward and downward directions as well as in the right and left directions. Accordingly, in case of the multi-functional subminiature speaker of the present invention, it is advantageous that it has a function of the bone conduction speaker of high reliability and good quality by allowing the vibration for the bone conduction to be generated over the whole housing unit, in comparison with the conventional bone conduction speaker, which results in a reduction in reliability and capacity of bone conduction due to the application of pressure to the projection from the external factors.

Furthermore, in case of the multi-functional subminiature speaker according to an embodiment of the present invention, it is advantageous that it has a function of the bone conduction speaker, which is capable of implementing the low voice region as well as the high voice region accurately, that is, implementing the wide-band region, by employing the corrugated cross-type vibration spring, in comparison with the conventional bone conduction speaker, which is not easy in implementing the low voice region.

Also, it is advantageous that it is possible to implement the function of the bone conduction speaker of the security mode, the function of the bodily sensation of vibration, the function of speaker attachment, and the function of the vibration mode based on the input signals of the PCB terminal used in the multi-functional subminiature speaker according to an embodiment of the present invention.

In addition, it is advantageous that it can be applied diversely by implementing the function of the acoustic speaker separately or concurrently by attaching the acoustic portion unit, if required, because it is possible to detachably mount the acoustic portion unit.

Additionally, according to the present invention, the manufacturing cost is low and subminiature design is possible while covering all the advantages described above.

BEST MODE FOR CARRYING OUT THE INVENTION

In order to achieve the above objects, according to the present invention, there is provided a multi-functional subminiature speaker that generates vibration for the functions of bone conduction, bodily sensation of vibration, speaker attachment, and vibration mode over the whole outside of a housing unit of the multi-functional subminiature speaker without any projections, including:

an acoustic portion unit detachably mounted between a side frame and a front protector for carrying out the acoustic speaker function, the acoustic portion unit including an acoustic plate and a voice coil;

the housing unit for generating the vibration over the whole outer surface thereof, and the housing unit including the front protector, a rear cover, a vibration coil support frame, and the side frame;

a vibration weight unit secured to the vibration spring to perform the vibrating movement, the vibration weight unit including a rivet shaft, a central magnet, an external magnet, an outer top plate, an inner top plate, and a yoke;

a PCB terminal adhesively mounted at the lower one side of the vibration coil support frame, for applying an electrical signal separately or concurrently to the voice coil and the vibration coil;

a cylindrical vibration coil mounted fixedly at the lower side of the inner end of the frame vertically, for vibrating the vibration weight unit by generating magnetic force in response to the external electrical input signal through the PCB terminal; and a corrugated round plate-type vibration spring for providing the vibration weight unit with elastic force of the vibrating movement after the central and external magnets are affected by the magnetic force generated from the vibration coil, the vibration spring being secured at an outer end thereof to the side frame of the housing unit, and being secured at an inner end thereof to the rivet shaft, whereby vibration can be generated over the whole outer side of the housing for the multi-functional subminiature speaker without any projection for the bone conduction, the bodily sensation of vibration, the speaker attachment, and the vibration mode.

Herein, the vibration weight unit includes a yoke secured to the vibration spring together with the magnets and the top plates by means of the rivet shaft for defining a portion of a magnetic path by attaching the magnets, which acts as field pole pieces;

the central magnet stacked on the yoke from the inside on the basis of the cylindrical vibration coil for vibrating the vibration weight unit with the inside magnetic force generated from the vibration coil;

the external magnet stacked on the yoke from the outside on the basis of the cylindrical vibration coil for vibrating the vibration weight unit with the external magnetic force generated from the vibration coil;

the outer top plate stacked on the upper side of the external magnet stacked on the yoke;

the inner top plate stacked on the upper side of the central magnet stacked on the yoke; and the rivet shaft for securing the inner top plate, the central magnet and the yoke in a hole disposed at the center of the vibration spring, wherein the inner top plate, the central magnet, and the yoke are stacked in this order.

Furthermore, the housing unit includes the front protector detachably mounted to the upper side of the outer end of the vibration coil support frame secured to the side frame for preventing interference by the external factors when the vibration weight unit performs the vibrating movements, wherein the front protector is formed with a plurality of holes for transmitting the inside sound to the outside therethrough, and is adapted to generate vibration for the bone conduction from an outer surface thereof;

the rear cover formed with a plurality of holes for transmitting the inside sound to the outside, and having an outer end thereof provided at the lower portion of the side frame so that the vibrating movement of the vibration weight unit secured to the vibration spring cannot be interfered by the external factors;

the vibration coil support frame formed in a donut shape and mounted at the upper end of the side frame for securing the vibration coil; and the cylindrical side frame for supporting the vibration coil support frame, the rear cover, and the vibration spring.

Also, the acoustic portion unit is detachably mounted to the housing unit of the multi-functional subminiature speaker, the central magnet is constructed in a double-layered structure in which an upper central magnet is stacked on a lower central magnet, the upper central magnet having a diameter shorter than that of the lower central magnet, at which time, an upper top plate is stacked on the upper side of the upper central magnet, and a lower top plate of the donut shape is stacked on the outer upper side of the lower central magnet on which the upper central magnet is stacked, such that the voice coil vertically secured to the lower side of the acoustic plate of the acoustic portion unit is prevented from being contacted with the vibration weight unit at the time of providing the acoustic portion unit, and wherein an outer end of the acoustic plate with the cylindrical voice coil installed at the lower side thereof is mounted between the vibration coil support frame of the housing unit and the front protector, thereby performing the functions of the acoustic speaker as well as bone conduction.

Figure 5:
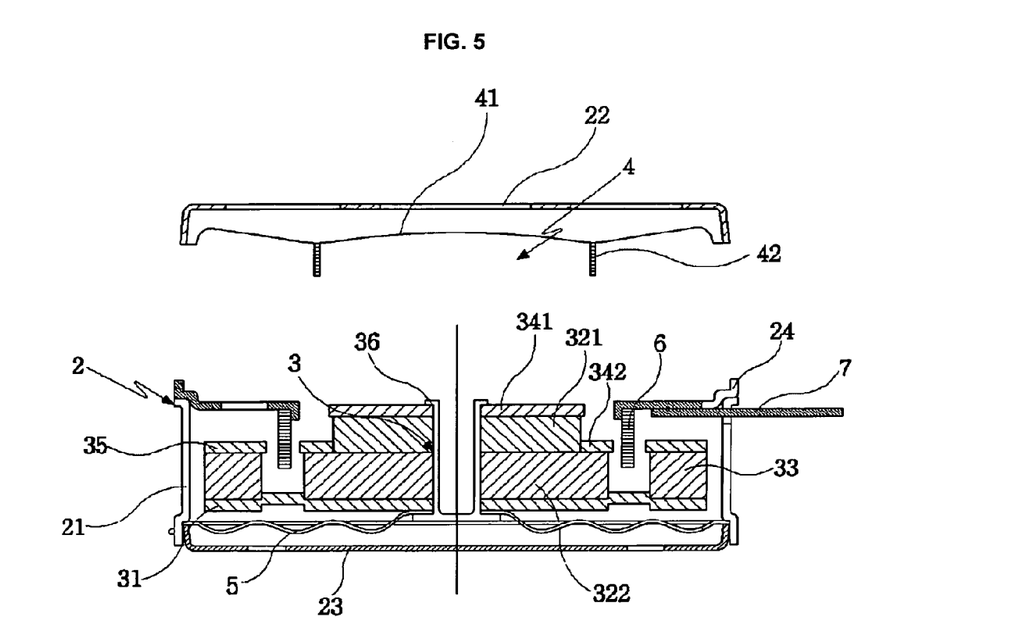
FIG. 5 is a cross-sectional view showing a multi-functional subminiature speaker according to an embodiment of the present invention, in which an acoustic portion unit can be detachably mounted.

Also, as shown in FIG. 5*b*, it is possible to manufacture the subminiature speaker whose size has been highly reduced, by removing the front protector and the acoustic portion unit, and substituting them with a vibration coil support protector modified from the vibration coil support frame.

In addition, the vibration spring, to which the vibration weigh unit is secured by means of the magnetic force generated from the vibration coil, is formed in such a manner that upper and lower flections are formed on the round plate made of stainless material to take a corrugated shape so that the air resistance of the vibration spring to which the vibration weight unit is secured can be minimized and the elastic force can be generated maximally by the magnetic force generated from the vibration coil, a hole is formed at the center portion thereof for securing the rivet shaft connected to the vibration weight unit thereto, and respective quadrants are removed so that an inner cross shape and an outer donut shape can be formed into a unitary piece.

According to the present invention, the rivet shaft can be made of copper material.

The front protector, the rear cover, and the vibration coil support frame are made of stainless material, and the front protector and the rear cover are formed with a plurality of holes on the dish shaped plane portion to transmit the acoustic signal accurately and protect the vibration movement of the vibration weight.

Also, the inner and outer top plates and the yoke can be made of zinc material.

MODE FOR THE INVENTION

Hereinafter, the preferred embodiment of the present invention will be described in detail with reference to the appending drawings.

Figure 4:
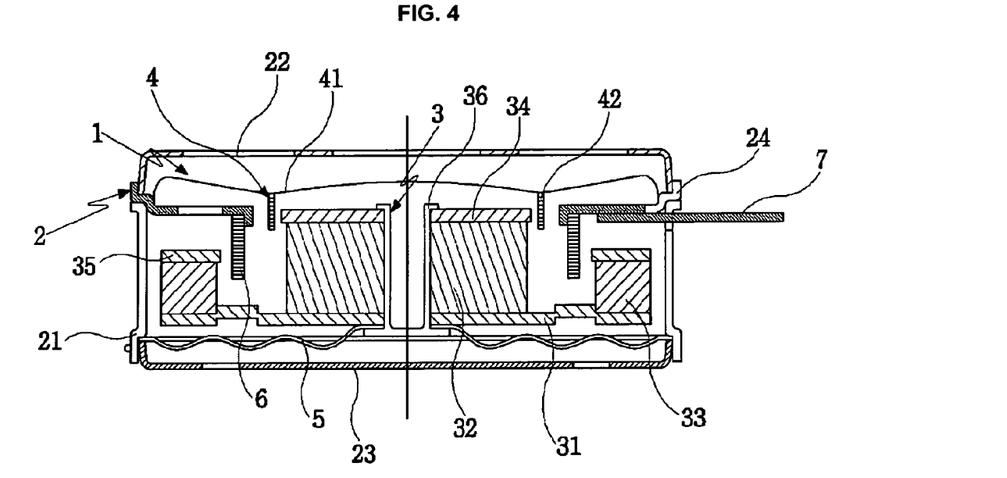
FIG. 4 is a cross-sectional view showing a multi-functional subminiature speaker according to an embodiment of the present invention.

FIG. 4 is a cross-sectional view showing a multi-functional subminiature speaker 1 according to the first embodiment of the present invention.

The multi-functional subminiature speaker 1 according to the present invention includes a side frame 21, as shown in FIG. 4, configured as a cylindrical shape, and in which upper and lower portions thereof are opened, a bending portion is formed at an upper end thereof so that a front protector 22 and an outer end of an acoustic portion unit 4 can be mounted, and a vibration spring 5 and an outer end of a rear cover 23 can be mounted.

The side frame 21 can be made of aluminum alloy or plastic material to transmit the vibration effectively and have durability.

A vibration coil support frame 24 is provided on the upper portion of the side frame 21 to secure the vibration coil 6. Also, an acoustic portion unit including an acoustic plate 41 and an acoustic coil 42 is provided detachably on the upper portion of the vibration coil support frame 24. A front protector 22 with a plurality of holes is provided detachably on the upper portion of the acoustic portion unit 4 so that the sound generated in the acoustic portion unit 4 can be smoothly transmitted to the outside and the vibration of the acoustic portion unit 4 cannot be interferred by the external factors.

A vibration spring 5 is provided at the lower portion of the side frame 21. Also, a rear cover 23 with a plurality of holes is provided at the lower portion of the vibration spring 5 so that the sound generated in the acoustic portion unit 4 can be smoothly transmitted to the outside and the vibration of the vibration weight unit 3 cannot be interferred by the external factors, as is in the front protector 22.

A vibration weight unit 3 is provided integrally on the upper portion of the vibration spring 5 by means of a rivet shaft 36. The vibration weight unit 3 is made by stacking a yoke 31 on the vibration spring 5, central and external magnets 32, 33 on the yoke, and inner and outer top plates 34, 35 on the magnets, and is provided on the upper portion of the vibration spring 5 through a hole formed at the center of the vibration spring 5 by means of the rivet shaft 36.

It is possible to generate stronger vibration force by increasing the weight of the vibration weight performing the vibrating movement to generate the vibration for the bone conduction, because the vibration weight unit 3 can be constructed integrally of the yoke 31, the central and external magnets 32, 33, and the inner and outer top plates 34, 35.

The magnetic force transmitted to the vibration coil 6 is affected by both sides of the central magnet 32 and the external magnet 33, because the magnets 32, 33 constituting the vibration unit 3 is consisted of the central magnet 32 at the inner portion and the external magnet 33 at the outside portion, and the vibration coil 6 is disposed at a space made between the central magnet 32 and the external magnet 33.

In case of the multi-functional subminiature speaker 1 according to an embodiment of the present invention, it is possible to reduce the loss of magnetic force generated from the vibration coil 6 by disposing the magnets 32, 33 at the inner and outer portions with respect to the vibration coil 6 in comparison with the conventional speaker, in which the magnet 33 was only disposed at the outer portion of the vibration coil 6, to thereby reduce the electric power consumption, and vibrate the vibration weight 3, which was made heavy, effectively.

Figure 6:
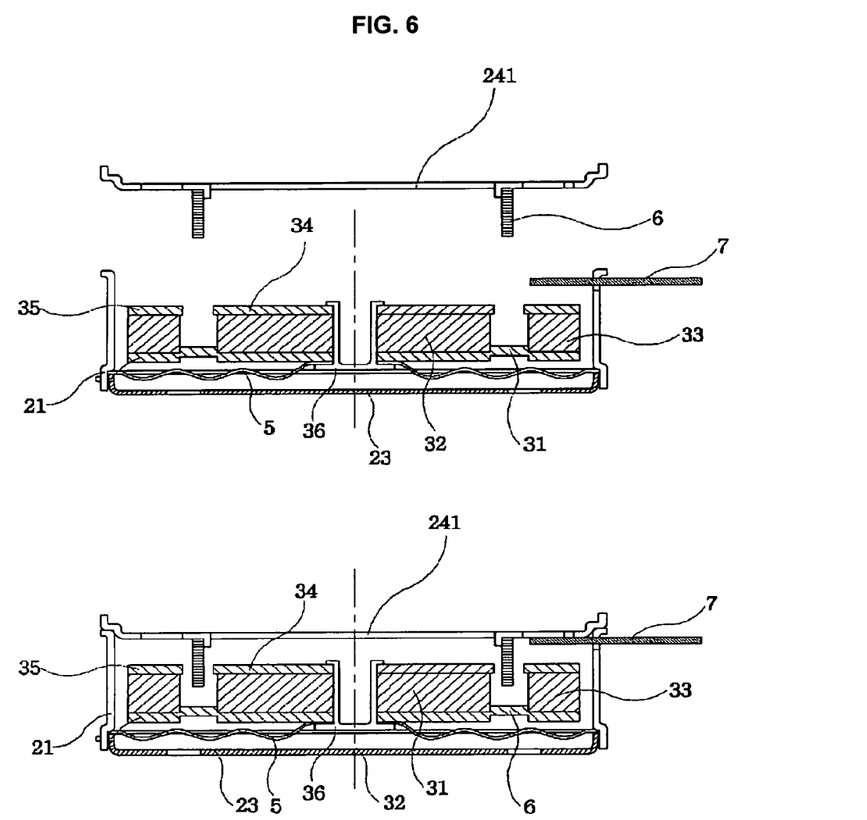
FIG. 6 is a cross-sectional view showing a multi-functional subminiature speaker according to an embodiment of the present invention which is made to be more compact.
Figure 7:
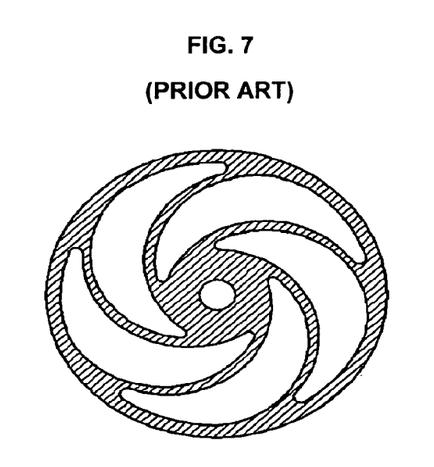
FIG. 7 is a view showing a configuration of a vibration spring used in the conventional bone conduction speaker.

As shown in FIGS. 6 and 7, the multi-functional subminiature speaker 1 according to an embodiment of the present invention is constructed such that the acoustic portion unit 4 can be detachably mounted separately, so that it can perform the functions of the acoustic speaker, the bone conduction, and the bodily sensation of vibration separately or concurrently.

Referring now to FIG. 5, the multi-functional subminiature speaker 1 is constructed such that the acoustic portion unit 4 can be detachably mounted to the housing unit 2 of the multi-functional subminiature speaker 1, and the cylindrical shaped central magnet 32 of the vibration weight unit 3 is constructed in a double-layered structure such that the voice coil 42 vertically secured to the lower side of the acoustic plate 41 is prevented from being contacted with the vibration weight unit 3 at the time of providing the acoustic portion unit 4.

With regard to the double-layered central magnet 32, an upper central magnet 321, which is smaller in diameter than the lower central magnet 322, is stacked on the lower central magnet 322, and an upper top plate 341 was stacked on the top end central magnet 321. Thus, the lower top plate 342 of the donut shape is stacked on the outer portion of the lower end central magnet 322 except a portion of the upper end central magnet 321 stacked on the upper side of the lower central magnet 322.

The present invention is characterized in that it is possible to apply for the bone conduction, the bodily sensation of vibration, and the vibration mode as well as the function of acoustic speaker by attaching the outer end of the acoustic plate 41, in which the cylindrical voice coil 42 is disposed vertically at the lower side, between the upper side of the vibration coil support frame 24 and the lower side of the front protector 22.

Referring now to FIG. 6, there is shown the multi-functional subminiature speaker, which is made to be more compact by replacing the vibration coil support protector 241 and detaching the acoustic portion unit 4 according to an embodiment of the present invention, and in which the subminiature speaker of reduced size can be manufactured by replacing the vibration coil support frame 24 with the transformed vibration coil support protector 241 after detaching the acoustic portion unit 4 and removing the front protector 22 and the acoustic portion unit 4, as shown in FIG. 6.

The present invention can provide the multi-functional subminiature speaker 1 with the function of bone conduction speaker, the function of bodily sensation of vibration capable of feeling the sound and the vibration concurrently with the whole body, the function of speaker attachment, for instance, the function of generating the sound by vibrating the medium when it is contacted with the medium such as paper, woods, iron plate, plastic, box, and the like, and the function of vibration mode such as the mobile phone vibrating without the projections by applying the corrugated cross-type vibration spring 5 according to an embodiment of the present invention to the multi-functional subminiature speaker 1.

Figure 8:
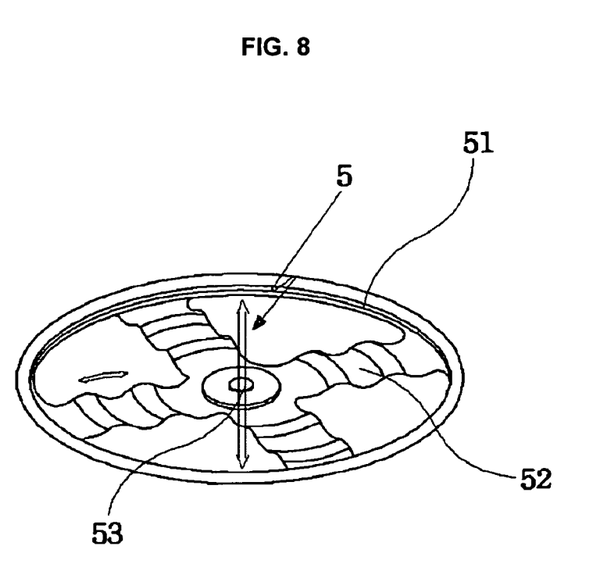
FIG. 8 is a view showing a configuration of a corrugated cross-type vibration spring according to an embodiment of the present invention.

FIG. 7 shows a conventional vibration spring, and FIG. 8 shows the corrugated cross-type vibration spring 5 according to an embodiment of the present invention. Prior to the explanation of the corrugated cross-type vibration spring 5 according to an embodiment of the present invention, the conventional vibration spring, shown in FIG. 7, was capable of generating the vibration only in the upward and downward directions by the limitation of the structure, and it was possible to perform the bone conduction via the skull bone only when the projection was directly connected to the vibration weight oscillating in the upward and downward directions. Thus, as described above, accurate vibration cannot be generated because the external factor such as the skull bone applied pressure on the projection, and the elastic force of the vibration spring was severely reduced in comparison with that of the vibration spring of the present invention.

However, as shown in FIG. 8, the corrugated cross-type vibration spring 5 according to an embodiment of the present invention is formed with a corrugated cross-type blade 52 having upper and lower flections at a donut-shaped circumference 51, and a through-hole 53 at the center thereof for securing the rivet shaft.

It is preferable that the corrugated cross-type vibration spring 5 is made of stainless steel material.

According to the corrugated cross-type vibration spring 5 of the present invention as described above, the vibration generated from the upper and lower movements can be transmitted to the entire housing unit 2 through the generation of the oscillation in the upward and downward directions as well as the oscillation in the right and left directions due to the expansion and contraction of the corrugated portions, because the corrugated portions formed at the corrugated blade 52 of the vibration spring 5 according to the present invention repeats actions of expansion and contraction when the magnets 32, 33 of the vibration weight unit 3 is affected by the magnetic force transmitted to the vibration coil 6 to thereby generate the upper and lower vibrating movements of the vibration weight unit 3. As a result, the multi-functional subminiature speaker 1 of the present invention can generate the vibration for the functions of the bone conduction, the bodily sensation of vibration, the speaker attachment, and the vibration mode over the entire outer side of the housing unit 2.

In addition, since the multi-functional subminiature speaker 1 according to an embodiment of the present invention includes a PCB terminal 7 capable of applying the electrical signal to the acoustic coil 42 and the vibration coil 6 separately or concurrently, it is possible to control the function of the acoustic speaker and/or the functions of the bone conduction, bodily sensation of vibration, speaker attachment, and the vibration mode.

Furthermore, the multi-functional subminiature speaker of the present invention has the bone conduction speaker function of the security mode, in which the user can hear the conversations and music without generating any noise to the outside, by applying the electric power of 30 mW to the vibration coil 6 from the PCB terminal 7. The security mode function as described above can be exemplarily used in the library, in the public place, or in the place requiring the secrecy of conversations.

Also, the multi-functional subminiature speaker of the present invention has the functions of the sound and bone conduction speaker, the vibration bodily sensation and the speaker attachment, in which it is possible to converse with others under such circumferential circumstances of large noise.

In addition, the function of vibration mode can be carried out by supplying an electric power of 700 mW to 1 W and uniform sine wave signal of 220 Hz to 26 Hz to the voice coil 6 from the PCB terminal 7. The vibration mode produces an advantage that it can be performed in addition to the speaker function without providing further equipments for the vibration mode when it is provided to the mobile communication terminal.

Although the present invention and its advantages have been described in detail, it should be understood that the present invention is not limited to the aforementioned descriptions and the accompanying drawings, and that various modifications, substitutions and alterations can be made herein by those peoples skilled in the relevant arts without departing from the scope and spirit of the present invention as defined by the appended claims.

INDUSTRIAL APPLICABILITY

As described above, the multi-functional subminiature speaker according to an embodiment of the present invention can provide the advantages that it is possible to perform the bone conduction without the projection because the vibration can be generated over the whole surface of the multi-functional subminiature speaker, that is, over the whole outer side of the housing unit, by constructing that loss of the magnetic force transmitted to the vibration coil is minimized by disposing the magnets on both inner and outer sides with respect to the vibration coil, the vibration force has been improved by making the vibration weight unit to be constructed of the yoke, the central and external magnets, and the inner and outer top plates integrally by means of the rivet shaft to thereby increase the weight of the vibration weight, and the corrugated cross-type vibration spring capable of generating the vibration over the whole housing unit by constructing it to vibrate the vibration weight of the increased weight effectively and to generate vibration in the upward and downward directions as well as in the right and left directions is employed. Accordingly, in case of the multi-functional subminiature speaker of the present invention, it is advantageous that it has a function of the bone conduction speaker of high reliability and good quality by constructing the vibration for the bone conduction to be generated over the whole housing unit, in comparison with the conventional bone conduction speaker, which was reduced in reliability and capacity of bone conduction due to the application of pressure to the projection from the external factors.

Furthermore, in case of the multi-functional subminiature speaker according to an embodiment of the present invention, it is advantageous that it has a function of the bone conduction speaker, which is capable of implementing the low voice region as well as the high voice region accurately, that is, implementing the wide-band region, by employing the corrugated cross-type vibration spring, in comparison with the conventional bone conduction speaker, which is not easy in implementing the low voice region.

Also, it is advantageous that it is possible to implement the function of the bone conduction speaker of the security mode, the function of the bodily sensation of vibration, the function of speaker attachment, and the function of the vibration mode based on the input signals of the PCB terminal used in the multi-functional subminiature speaker according to an embodiment of the present invention.

In addition, it is advantageous that it can be applied diversely by implementing the function of the acoustic speaker separately or concurrently by attaching the acoustic portion unit, if required, because it is possible to detachably mount the acoustic portion unit.

Additionally, according to the present invention, the manufacturing cost is low and subminiature design is possible while covering all the advantages described above.

The invention claimed is:
1. A multi-functional subminiature speaker that generates vibration for the functions of bone conduction, bodily sensation of vibration, speaker attachment, and vibration mode over the whole outside of a housing unit of the multi-functional subminiature speaker without any projections, comprising:
- an acoustic portion unit detachably mounted between a side frame and a front protector for carrying out the acoustic speaker function, the acoustic portion unit including an acoustic plate and a voice coil;
- the housing unit for generating the vibration over the whole outer surface thereof, and the housing unit including the front protector, a rear cover, a vibration coil support frame, and the side frame;
- a vibration weight unit secured to the vibration spring to perform the vibrating movement, the vibration weight unit including a rivet shaft, a central magnet, an external magnet, an outer top plate, an inner top plate, and a yoke;
- a PCB terminal adhesively mounted at the lower one side of the vibration coil support frame, for applying an electrical signal separately or concurrently to the voice coil and the vibration coil;
- a cylindrical vibration coil mounted fixedly at the lower side of the inner end of the frame vertically, for vibrating the vibration weight unit by generating magnetic force in response to the external electrical input signal through the PCB terminal; and
- a corrugated round plate-type vibration spring for providing the vibration weight unit with elastic force of the vibrating movement after the central and external magnets are affected by the magnetic force generated from the vibration coil, the vibration spring being secured at an outer end thereof to the side frame of the housing unit, and being secured at an inner end thereof to the rivet shaft.

2. The multi-functional subminiature speaker according to claim 1, wherein the vibration weight unit comprises:
- a yoke secured to the vibration spring together with the magnets and the top plates by means of the rivet shaft for defining a portion of a magnetic path by attaching the magnets, which acts as field pole pieces
- the central magnet stacked on the yoke from the inside on the basis of the cylindrical vibration coil for vibrating the vibration weight unit with the inside magnetic force generated from the vibration coil;
- the external magnet stacked on the yoke from the outside on the basis of the cylindrical vibration coil for vibrating the vibration weight unit with the external magnetic force generated from the vibration coil;
- the outer top plate stacked on the upper side of the external magnet stacked on the yoke;
- the inner top plate stacked on the upper side of the central magnet stacked on the yoke; and
- the rivet shaft for securing the inner top plate, the central magnet and the yoke in a hole disposed at the center of the vibration spring, wherein the inner top plate, the central magnet, and the yoke are stacked in this order.

3. The multi-functional subminiature speaker according to claim 1, wherein the vibration spring is formed in such a manner that upper and lower flections are formed on the round plate made of stainless material to take a corrugated shape so that the air resistance of the vibration spring to which the vibration weight unit is secured can be minimized and the elastic force can be generated maximally by the magnetic force generated from the vibration coil, a hole is formed at the center portion thereof for securing the rivet shaft connected to the vibration weight unit thereto, and respective quadrants are removed so that an inner cross shape and an outer donut shape can be formed into a unitary piece.

4. The multi-functional subminiature speaker according to claim 1, wherein the bone conduction function of a security mode can be performed by applying electric power of 30 mW to the vibration coil from the PCB terminal.

5. The multi-functional subminiature speaker according to claim 1, wherein the speaker function capable of hearing under the surrounding environment having large noise, and the functions of bodily sensation of vibration, and the speaker attachment can be performed by applying electric power ranging from 700 mW to 1 W to the vibration coil from the PCB terminal.

6. The multi-functional subminiature speaker according to claim 1, wherein the vibration mode function can be performed by applying electric power ranging from 700 Mw to 1 W and a uniform sine wave signal of raging from 220 Hz to 260 Hz to the vibration coil from the PCB terminal.

7. The multi-functional subminiature speaker according to claim 1, wherein the housing unit comprises:
- the front protector detachably mounted to the upper side of the outer end of the vibration coil support frame secured to the side frame for preventing interference by the external factors when the vibration weight unit performs the vibrating movements, wherein the front protector is formed with a plurality of holes for transmitting the inside sound to the outside therethrough, and is adapted to generate vibration for the bone conduction from an outer surface thereof;
- the rear cover formed with a plurality of holes for transmitting the inside sound to the outside, and having an outer end thereof provided at the lower portion of the side frame so that the vibrating movement of the vibration weight unit secured to the vibration spring cannot be interferred by the external factors;
- the vibration coil support frame formed in a donut shape and mounted at the upper end of the side frame for securing the vibration coil; and
- a cylindrical side frame for supporting the vibration coil support frame, the rear cover, and the vibration spring.

8. The multi-functional subminiature speaker according to claim 7, wherein the acoustic portion unit is detachably mounted to the housing unit of the multi-functional subminiature speaker, the central magnet is constructed in a double-layered structure in which an upper central magnet is stacked on a lower central magnet, the upper central magnet having a diameter shorter than that of the lower central magnet, at which time, an upper top plate is stacked on the upper side of the upper central magnet, and a lower top plate of the donut shape is stacked on the outer upper side of the lower central magnet on which the upper central magnet is stacked, such that the voice coil vertically secured to the lower side of the acoustic plate of the acoustic portion unit is prevented from being contacted with the vibration weight unit at the time of providing the acoustic portion unit, and wherein an outer end of the acoustic plate with the cylindrical voice coil installed at the lower side thereof is mounted between the vibration coil support frame of the housing unit and the front protector, thereby performing the functions of the acoustic speaker as well as bone conduction.

* * * * *